(12) United States Patent
Kraft et al.

(10) Patent No.: US 11,764,386 B2
(45) Date of Patent: Sep. 19, 2023

(54) FUEL CELL DEVICE

(71) Applicant: ElringKlinger AG, Dettingen (DE)

(72) Inventors: Juergen Kraft, Metzingen (DE);
Michael Goetz, Dettingen/Erms (DE);
Manuel Morcos, Tuebingen (DE)

(73) Assignee: EKPO FUEL CELL TECHNOLOGIES GmbH, Dettingen (DE)

( * ) Notice: Subject to any disclaimer, the term of this patent is extended or adjusted under 35 U.S.C. 154(b) by 534 days.

(21) Appl. No.: 16/739,554

(22) Filed: Jan. 10, 2020

(65) Prior Publication Data
US 2020/0153024 A1 May 14, 2020

Related U.S. Application Data

(63) Continuation of application No. PCT/EP2018/068559, filed on Jul. 9, 2018.

(30) Foreign Application Priority Data

Jul. 14, 2017 (DE) ...................... 10 2017 115 878.2

(51) Int. Cl.
*H01M 8/2475* (2016.01)

(52) U.S. Cl.
CPC ................. *H01M 8/2475* (2013.01)

(58) Field of Classification Search
CPC ............................ H01M 8/2475; Y02E 60/50
See application file for complete search history.

(56) References Cited

U.S. PATENT DOCUMENTS

| | | | |
|---|---|---|---|
| 10,104,761 B1* | 10/2018 | MacDonald | H04R 27/00 |
| 2004/0023095 A1 | 2/2004 | Middelman et al. | |
| 2004/0241521 A1* | 12/2004 | Finkelshtain | H01M 8/1009 |
| | | | 429/454 |
| 2006/0134470 A1 | 6/2006 | Kaye et al. | |
| 2009/0191805 A1 | 7/2009 | Cusumano et al. | |
| 2009/0269627 A1 | 10/2009 | Zhang et al. | |
| 2010/0015503 A1 | 1/2010 | Yaguchi et al. | |
| 2010/0028752 A1 | 2/2010 | Kattner et al. | |
| 2011/0008709 A1* | 1/2011 | Shishikura | H01M 4/9016 |
| | | | 429/483 |
| 2014/0272662 A1* | 9/2014 | Rock | H01M 8/2475 |
| | | | 429/468 |

(Continued)

FOREIGN PATENT DOCUMENTS

DE    10 2009 034 380    1/2011

*Primary Examiner* — Muhammad S Siddiquee
(74) *Attorney, Agent, or Firm* — Womble Bond Dickinson (US) LLP

(57) ABSTRACT

A fuel cell device is provided, including a fuel cell stack, which includes a plurality of fuel cell units following each other in a stacking direction, and two end plates, between which the fuel cell stack is arranged. With the fuel cell device, harmful effects from hydrogen exiting the fuel cell units are avoided without making access to the fuel cell units impossible or causing a disproportionately large maintenance expenditure. The fuel cell device includes an enclosure which surrounds the fuel cell stack and the end plates, wherein the free remaining volume that remains within the enclosure between the enclosure, the fuel cell stack, and the end plates is less than 20% of the internal volume of the enclosure.

13 Claims, 11 Drawing Sheets

(56) References Cited

U.S. PATENT DOCUMENTS

| | | | |
|---|---|---|---|
| 2015/0188180 A1* | 7/2015 | Kim | H01M 8/2475 |
| | | | 429/470 |
| 2016/0186463 A1* | 6/2016 | Roatis | E05B 47/0673 |
| | | | 70/266 |
| 2017/0155160 A1 | 6/2017 | Boehm | |
| 2020/0132290 A1* | 4/2020 | Sismanidou | H01R 13/5845 |

* cited by examiner

FUEL CELL DEVICE

CROSS-REFERENCE TO RELATED APPLICATIONS

This application is a continuation of international application number PCT/EP2018/068559 filed on Jul. 9, 2018 and claims the benefit of German application number 10 2017 115 878.2 filed on Jul. 14, 2017, which are incorporated herein by reference in their entirety and for all purposes.

FIELD OF DISCLOSURE

The present invention relates to a fuel cell device which comprises a fuel cell stack, that comprises a plurality of fuel cell units following each other in a stacking direction, and two end plates, between which the fuel cell stack is arranged.

BACKGROUND OF THE INVENTION

Such fuel cell stacks are typically arranged together with peripheral system components, like, for example, an oxidizing agent supply means, a cooling means, and a fuel gas supply means, in a compulsorily aerated installation space of the system environment, for example of a vehicle or an emergency power supply system. The forced aeration hereby ensures that, even in the case of failure in which hydrogen is released from the system, the formation of an explosive air/gas mixture and the risk of explosion associated therewith is prevented.

As a result of the forced aeration, the components of the fuel cell device are subject to environmental influences. As a result of the entry of dust, contamination, moisture, or water, corresponding deposits may form on the components of the fuel cell device, in particular on the fuel cell stack. The fuel cell stack must be protected from such deposits, because no electrically conductive layer should form across the fuel cell units of the fuel cell stack. Such an electrically conductive layer could lead in particular, by way of leakage currents, to a parasitic power consumption, an additional heat generation, and/or and influence on the cell voltage measurement and could impair the fuel cell device in an undesired manner.

Even a layer of deposits that is not electrically conductive may be harmful, because as a result thereof, for example in the case of condensation of water from the air, the fuel cell stack remains wet significantly longer than in the absence of such deposits, which may lead to disturbances, in particular to increased corrosion, in components of the fuel cell device.

The formation of deposits on the components of the fuel cell device should therefore be avoided where possible.

It is known from US 2009/0191805 A1 to operate a forced aeration system for a fuel cell device with a filter which prevents the entry of dust into the fuel cell device. The use of a filter, however, is associated with an increased pressure loss of the forced aeration and with a correspondingly higher power consumption of the blower driving the forced aeration. Furthermore, the maintenance of the filter causes undesired additional expenditure. The use of a filter in a forced aeration system is associated with very high maintenance expenditure, in particular in applications with heavy dust and/or dirt contamination.

In US 2004/0023095 A1, it is proposed to manufacture bipolar plates of a fuel cell stack with a border made of an electrically insulating polymer-based material.

It is further known to encapsulate a fuel cell stack completely in an electrically insulating encapsulating material. Such an encapsulation of the fuel cell stack is associated with a high expenditure and high costs, however. Furthermore, it makes access to the individual fuel cell units of the fuel cell stack and in particular and exchange thereof more difficult. If a region on the outer surfaces of the fuel cell units is kept free of encapsulating material in order to enable a voltage measurement of an individual cell, the problems described above may still occur in this region.

SUMMARY OF THE INVENTION

The object underlying the present invention is to create a fuel cell device of the kind stated at the outset, in which harmful effects from hydrogen exiting the fuel cell units are avoided, without making access to the fuel cell units impossible or involving a disproportionately large maintenance expenditure.

This object is achieved in accordance with the invention in a fuel cell device with the features of the preamble of Claim 1, in that the fuel cell device comprises an enclosure which surrounds the fuel cell stack and the end plates, wherein the free remaining volume that remains within the enclosure between the enclosure, the fuel cell stack, and the end plates is less than 20%, preferably less than 10%, in particular less than 5%, of the internal volume of the enclosure.

The internal volume of the enclosure is hereby the volume that is delimited outwardly by the enclosure; the volume of the enclosure itself thus does not count towards the internal volume of the enclosure.

The free remaining volume remaining within the enclosure is preferably so small that a tertiary explosion protection is ensured for the fuel cell device. This means that even when an explosive mixture, in particular a hydrogen-containing mixture, is present in the free remaining volume within the enclosure and this mixture is indeed ignited, the free remaining volume in which the explosion takes place is so small and/or is subdivided into small individual volumes such that the fuel cell stack and the enclosure are not damaged by the explosion and thus the fuel cell device retains its full functionality, even after an explosion.

It is further favorable if the enclosure is sealed against the penetration of dirt and/or moisture into the interior of the enclosure.

In particular, provision may be made for the enclosure to be configured such that it corresponds at least to the protection rating IP6X in accordance with DIN EN 60529.

The tightness of the enclosure corresponding to the required protection class may be achieved, for example, by means of labyrinth seals, sealing ring arrangements, fiber inserts, brushes or the like.

Provision is preferably further made for the enclosure to be configured such that it corresponds at least to the water protection rating 4, in particular at least to the water protection rating 5, particularly preferably at least to the water protection rating 6, most preferably at least to the water protection rating 7, in accordance with DIN EN 60529.

In order to keep the remaining volume remaining within the enclosure as minimal as possible, it is favorable if the distance between the outside of the fuel cell stack and the inside of the enclosure perpendicular to the stacking direction is less than 5 mm, preferably is less than 2 mm, particularly preferably is less than 1 mm, substantially everywhere.

Provision may further be made for the enclosure to comprise a filling material for reducing the remaining volume remaining within the enclosure.

In particular, provision may be made for the enclosure to comprise a foam material, preferably a closed-porous foam material, for example a silicone foam material.

The foam material is preferably compressible and preferably adapts well to the outer contour of the fuel cell stack and to the inner contour of a base body of the enclosure.

In a preferred embodiment of the invention, provision is made for the enclosure to comprise one or more outer shell elements made of a thermoplastic material or of an organic sheet material.

The thermoplastic material may comprise, for example, a PVDF (polyvinylidene fluoride) material and/or a, preferably glass fiber-reinforced, polyamide (PA) material.

At least one outer shell element of the enclosure may be produced, for example, in a shaping method, in particular in an injection-molding method or in a thermoforming method.

Furthermore, the enclosure may comprise a sandwich material.

It is particularly favorable if the enclosure comprises a material which corresponds at least to the fire protection class V0.

In particular, provision may be made for the enclosure to consist substantially entirely of a material that corresponds at least to the fire protection class V0.

In order to prevent an overpressure from forming within the enclosure and leading to a hazard in the case of failure with a leakage of the fuel cell stack, the enclosure preferably has a gas exchange opening and/or a gas exchange valve. By means of the gas exchange opening or the gas exchange valve, gas, in particular hydrogen, is able to exit the interior of the enclosure into the surroundings of the enclosure and the fuel cell device.

The gas exchange valve is preferably configured as a check valve which enables an escape of gas from the interior of the enclosure into the exterior, but prevents penetration of gas, moisture and/or contamination from the exterior into the interior of the enclosure.

The gas exchange opening is preferably configured so small that the penetration of moisture and/or contamination from the exterior into the interior of the enclosure through the gas exchange opening is largely avoided.

In order to enable a flow out of the enclosure of liquid exiting the fuel cell stack, collecting between the enclosure and the fuel cells stack, or condensing in the interspace between the enclosure and the fuel cell stack, provision is preferably made for the enclosure to have a liquid outlet opening and/or a liquid outlet valve.

Such a liquid outlet opening and/or such a liquid outlet valve may be connected to a liquid discharge conduit.

The liquid discharge conduit may be configured in particular as a pipeline or as a hose line.

The liquid discharge conduit may connect the liquid outlet opening and/or the liquid outlet valve to a liquid collecting means arranged outside of the enclosure.

The liquid outlet valve may be configured as a check valve in order to avoid gas, moisture, and/or contamination penetrating though the liquid outlet valve from the exterior into the interior of the enclosure.

The liquid outlet opening is preferably configured so small that penetration of moisture and/or contamination from the exterior into the interior of the enclosure through the liquid outlet opening is largely avoided.

In a preferable embodiment of the invention, provision is made for the enclosure to be fixed on at least one end plate by means of at least one fastening arrangement.

Such a fastening arrangement may comprise, in particular, a screw, a spring disc, a washer, and/or a cap ring.

Furthermore, provision may be made for the fuel cell device to comprise at least one cover cap for covering a fastening arrangement, preferably from the outside of the covering.

The enclosure is preferably releasable form the fuel cell stack.

In a preferred embodiment of the invention, provision is made for the enclosure to comprise a base body and a lid.

The base body may be composed of a plurality of shell elements in order to facilitate the mounting of the base body on the end plates and on the fuel cell stack.

The media ports of the fuel cell stack, in particular the ports for the supply of fuel gas, for the supply of oxidizing agent, for the discharge of anode exhaust gas, and for the discharge of cathode exhaust gas, as well as for the supply and the discharge of coolant, as the case may be, are preferably each guided though one of the end plates of the fuel cell device.

The enclosure encloses the fuel cell stack and is attached to the end plates in a suitable manner.

The enclosure is preferably formed of an electrically insulating material.

Alternatively hereto, an electrically conductive material with an insulating coating may also be used as the material for the enclosure, or a multi-layer material with at least one insulating outer layer, preferably with two insulating outer layers.

An electrically insulating material layer is preferably provided in particular on the inside of the enclosure.

With a suitable attachment to the end plates, the outside of the enclosure may be configured to be electrically conductive.

In a particular embodiment of the invention, the enclosure is fixed only on one of the two end plates, while the enclosure is able to move relative to the second end plate in a covering, such that changes in the length of the fuel cell stack due to thermal effects and/or due to production tolerances are able to be compensated. The covering thereby ensures the necessary tightness.

The covering may be configured as a separate lid or one of the end plates may take over the function of the covering.

The fuel cell device may comprise a cell voltage monitoring unit arranged within the enclosure.

A shock-proof protection for the fuel cell stack is also ensured by the enclosure.

Further features and advantages of the invention are the subject matter of the subsequent description and the illustrative depiction of an exemplary embodiment.

BRIEF DESCRIPTION OF THE DRAWINGS

The same or functionally equivalent elements are provided with the same reference numerals in all Figures.

DETAILED DESCRIPTION OF THE INVENTION

Figure 6:
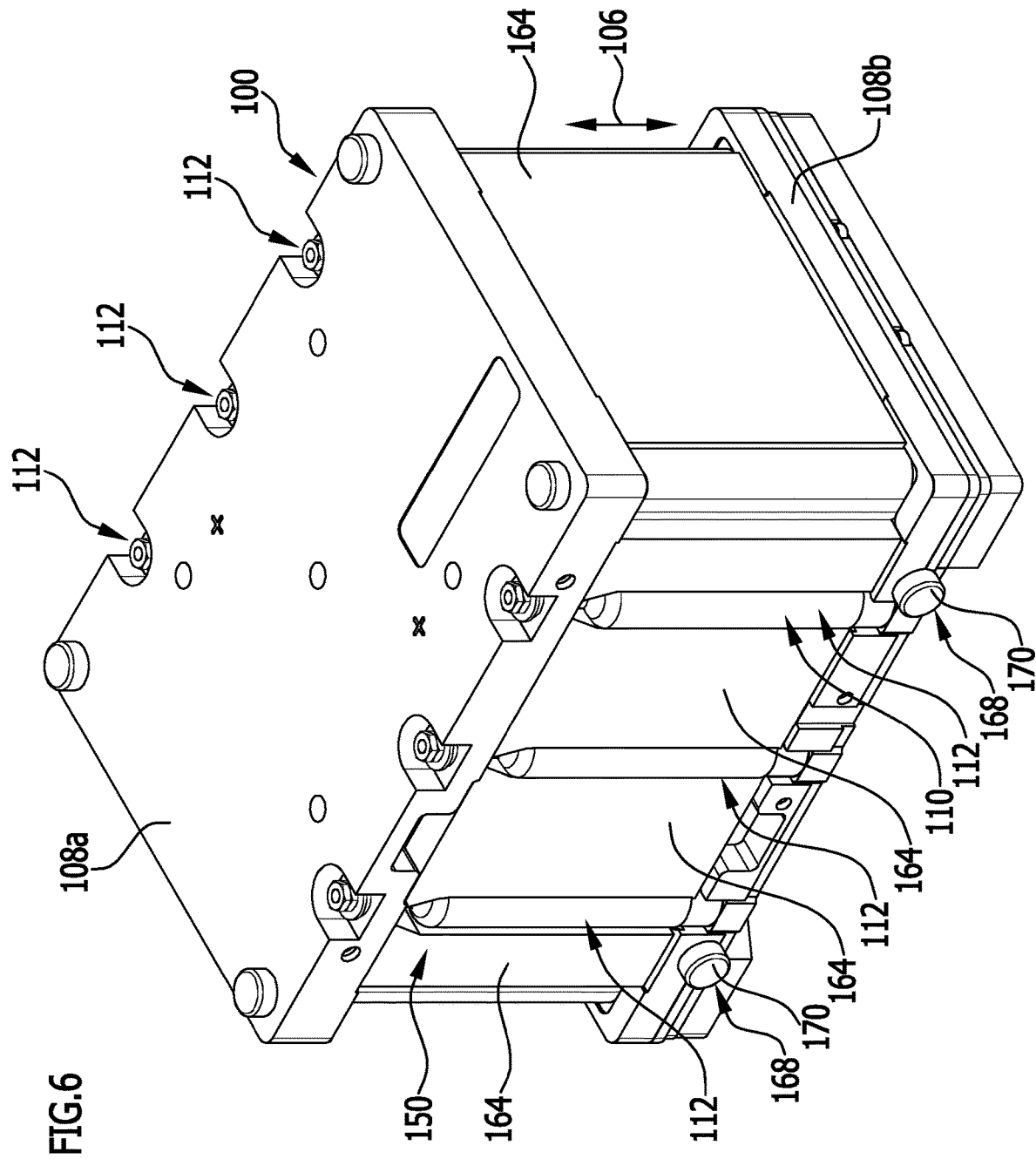
FIG. 6 shows a perspective depiction of the fuel cell device from FIG. 4 after a base body of the enclosure has also been removed.
Figure 7:
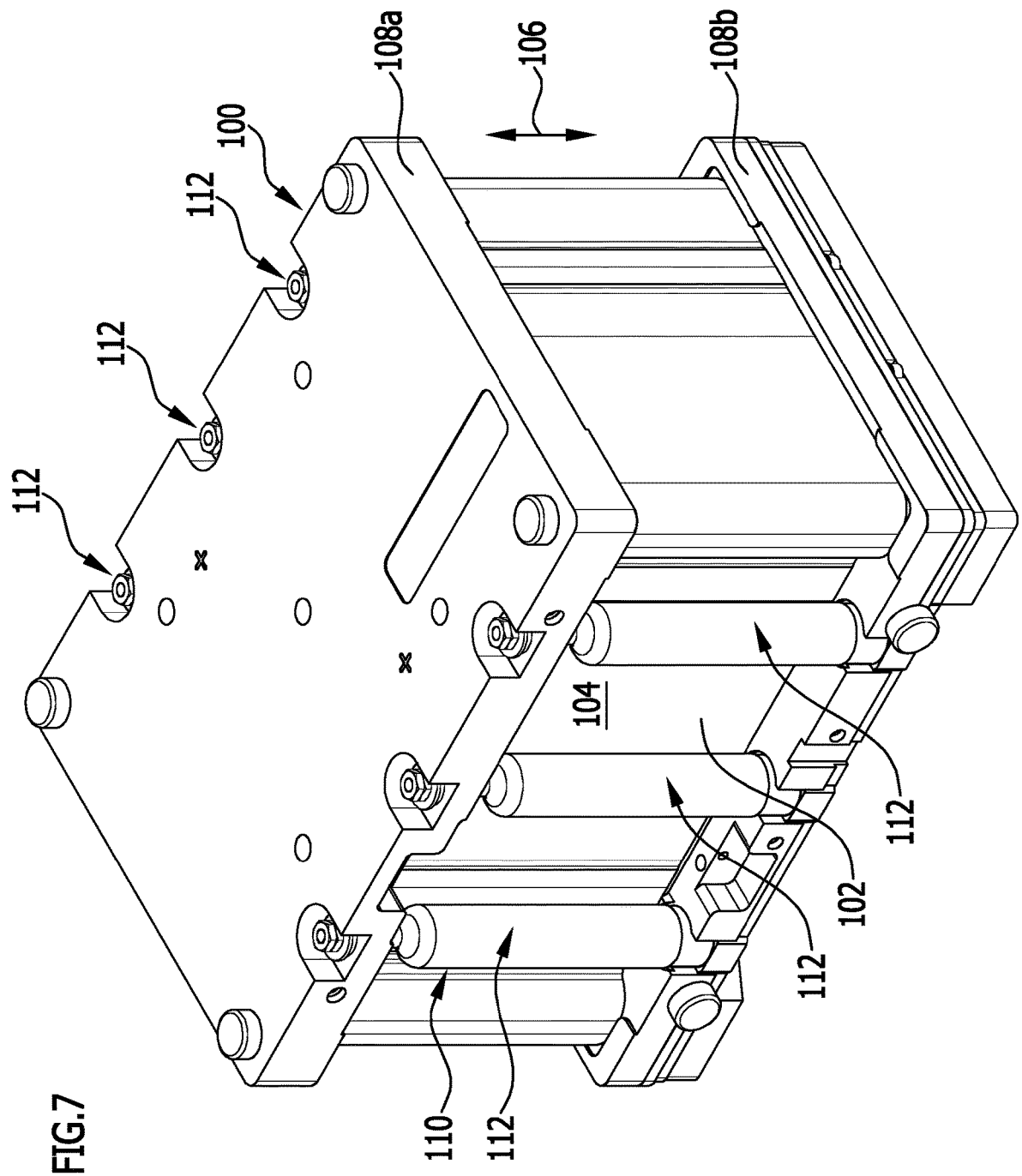
FIG. 7 shows a perspective depiction of the fuel cell device from FIG. 6 after foam material elements of the enclosure have been removed.

A fuel cell device, depicted in FIGS. 1, 4, 6, and 7 in different assembly stages and designated as a whole with 100, comprises a fuel cell stack 102 which is depicted in FIG. 7 only schematically with its enveloping outer contour 104. Said fuel cell stack 102 comprises a plurality of fuel cell units following each other in a stacking direction 106 (which are not depicted individually in FIG. 7).

Furthermore, the fuel cell device 100 comprises two end plates 108a and 108b, between which the fuel cell stack 102 is arranged, and a clamping device 110, by means of which the two end plates 108a and 108b are braceable against each other along the stacking direction 106 in order to apply the fuel cell stack 102 arranged between the end plates 108a, 108b with a clamping force.

The clamping device 110 comprises one or more, for example four or more, in particular six or more, clamping elements 112 which are arranged, for example, in the outer rim region of the end plate 108a and the end plate 108b.

Figure 8:
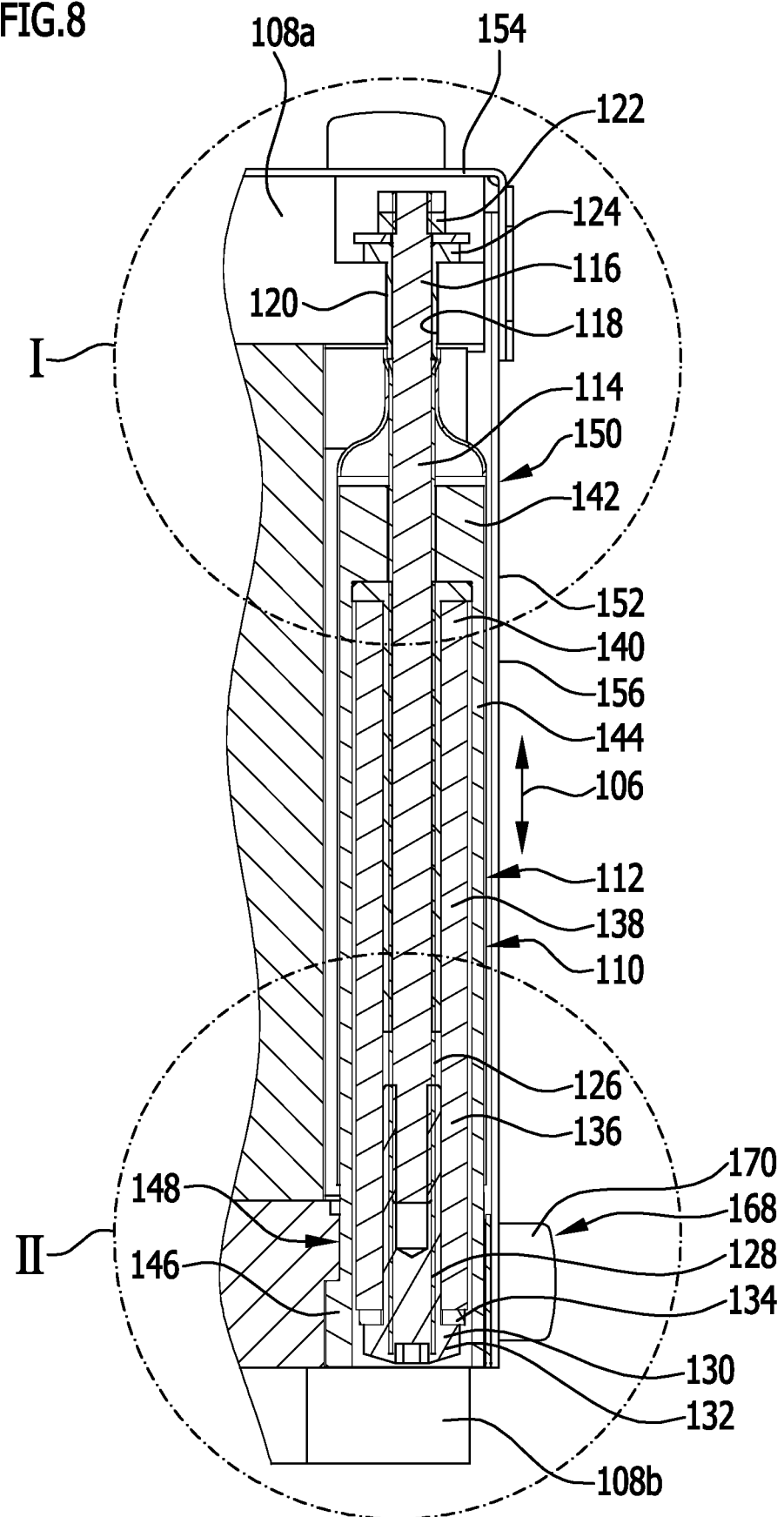
FIG. 8 shows a section through the fuel cell device from FIGS. 1 to 3 in the region of a clamping element of the clamping device, along the stacking direction of the fuel cell stack and along the line 8-8 in FIG. 2.
Figure 9:
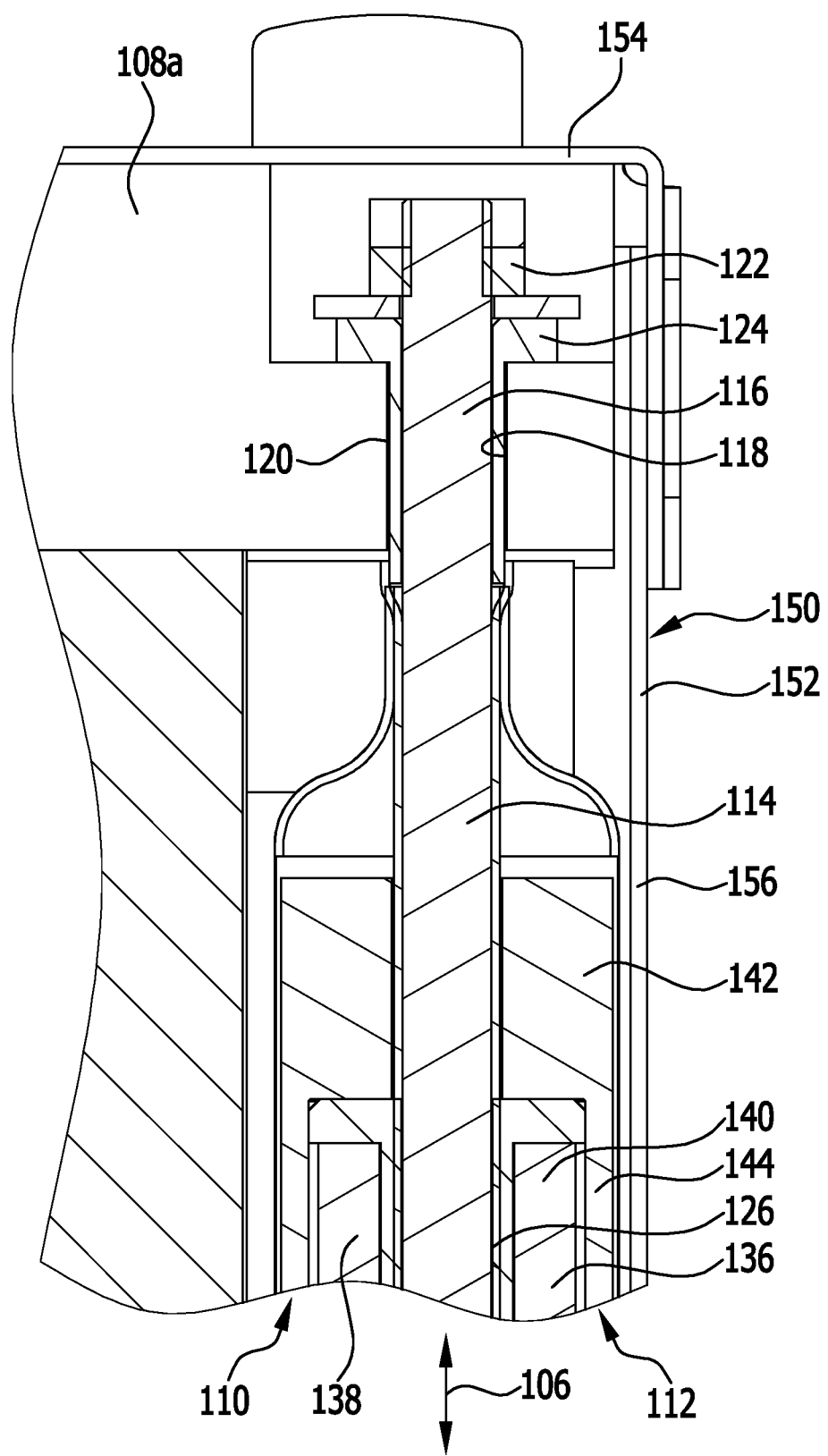
FIG. 9 shows an enlarged depiction of the region I from FIG. 8.
Figure 10:
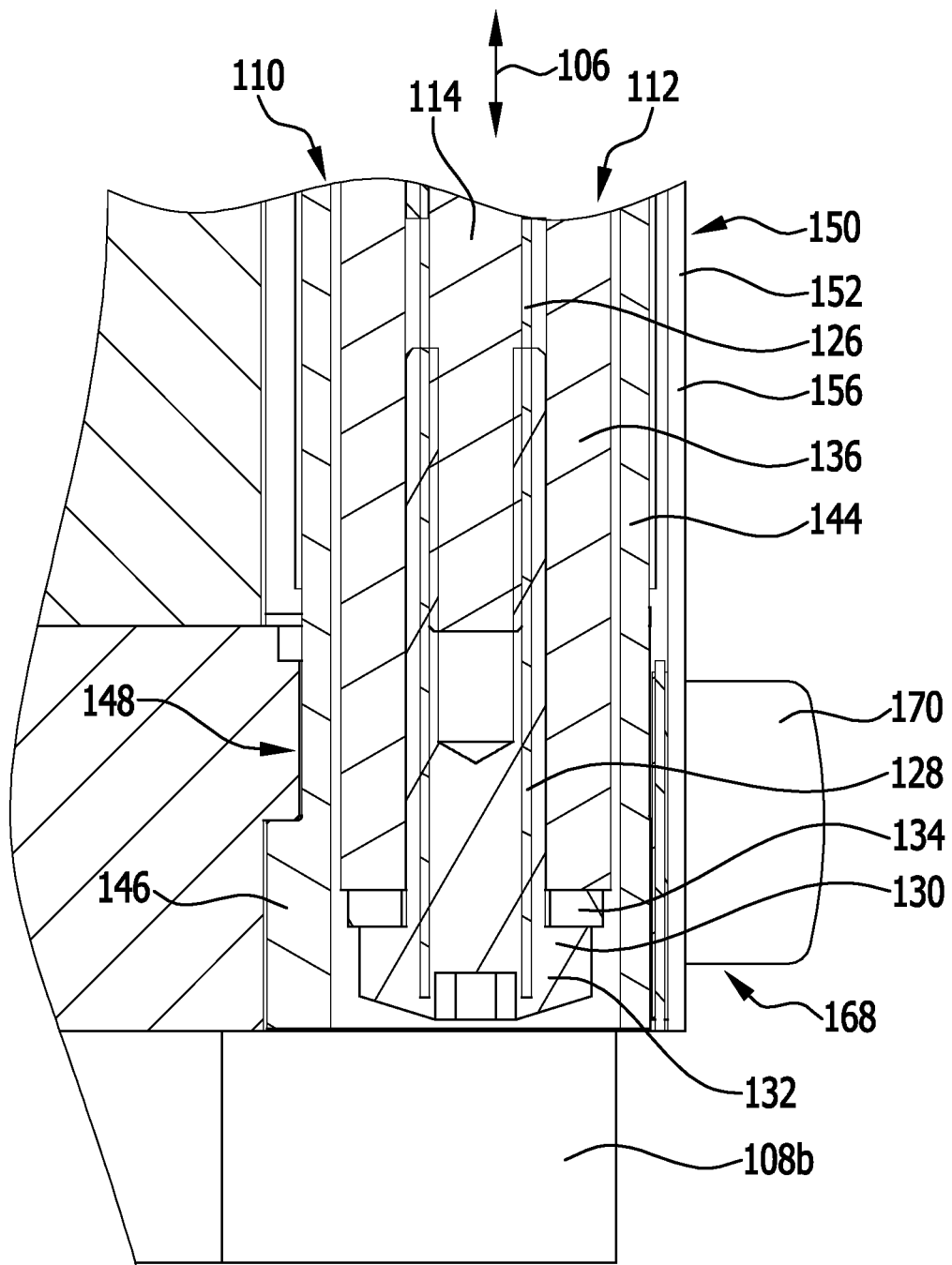
FIG. 10 shows an enlarged depiction of the region II from FIG. 8.

A possibility for the structure of such a clamping element 112 can be seen in FIGS. 8 to 10.

In the case of this exemplary structure, the clamping element 112 comprises a clamping screw 114, the shank 116 of which extends in parallel to the stacking direction 106 through a through-opening 118 in the end plate 108a.

The clamping screw 114 may hereby be guided on the end plate 108a by means of a guide bush 120 which is inserted into the through-opening 118 of the end plate 108a.

A screw head 122 of the clamping screw 114 may hereby bear on a collar 124 of the guide bush 120.

An external threading 126 provided on the shank 116 of the clamping screw 114 is in engagement with an internal threading 128 of a hollow screw 130 complementary thereto.

A first end region 134 of an elastic element 136, for example in the form of a spring element 138, in particular a pressure screw spring, is supported on a side of a head 132 of the hollow screw 130 that faces toward the end plate 108a.

A second end region 140 of the elastic element 136 that is remote from the first end region 134 of the elastic element 136 is supported on an end region 142 of a clamping sleeve 144 that faces toward the end plate 108a.

A second end region 146 of the clamping sleeve 144 that is remote from the first end region 142 engages behind a projection 148 of the end plate 108b.

The end plate 108b is thus drawn against the end plate 108a by the clamping element 112 with a clamping force which corresponds to the elastic restoring force of the elastic element 136.

By rotating the external threading 126 of the clamping screw 114 into the internal threading 128 of the hollow screw 130, said clamping force is increased; by rotating the external threading 126 of the clamping screw 114 out of the internal threading 128 of the hollow screw 130, said clamping force is reduced.

The entire clamping force by which the end plates 108a and 108b are braced against each other by means of the clamping device 110 and with which the fuel cell stack 102 arranged between the end plates 108a and 108b are applied corresponds to the sum of the clamping forces generated by the clamping elements 112 of the clamping device 110.

The fuel cell device 100 further comprises an enclosure 150 which surrounds the fuel cell stack 102 and the end plates 108a, 108b.

Figure 1:
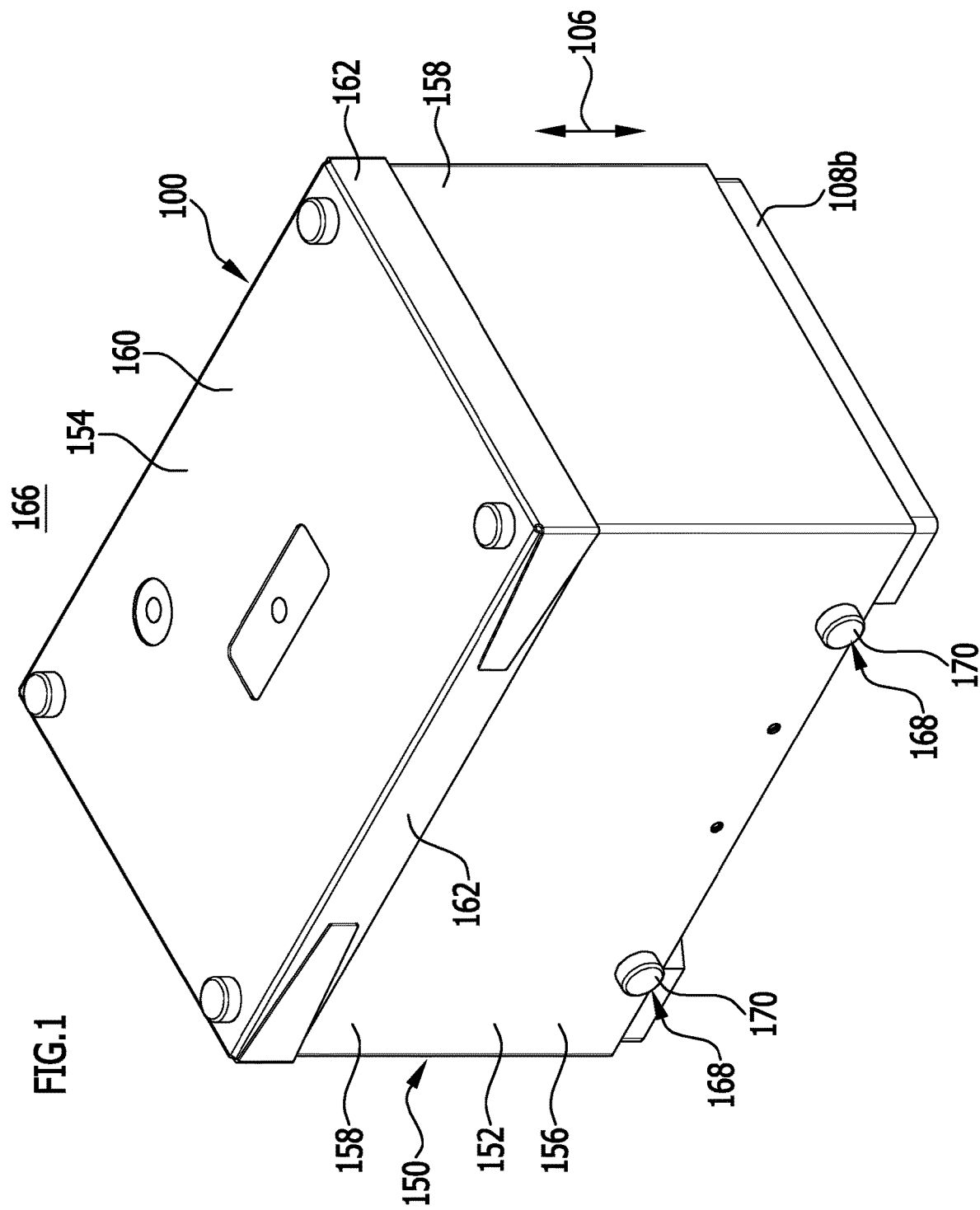
FIG. 1 shows a perspective depiction of a fuel cell device which comprises a fuel cell stack, that comprises a plurality of fuel cell units following each other in a stacking direction, two end plates, between which the fuel cell stack is arranged, a clamping device for bracing the two end plates against each other, and an enclosure that surrounds the fuel cell stack and the end plates.
Figure 2:
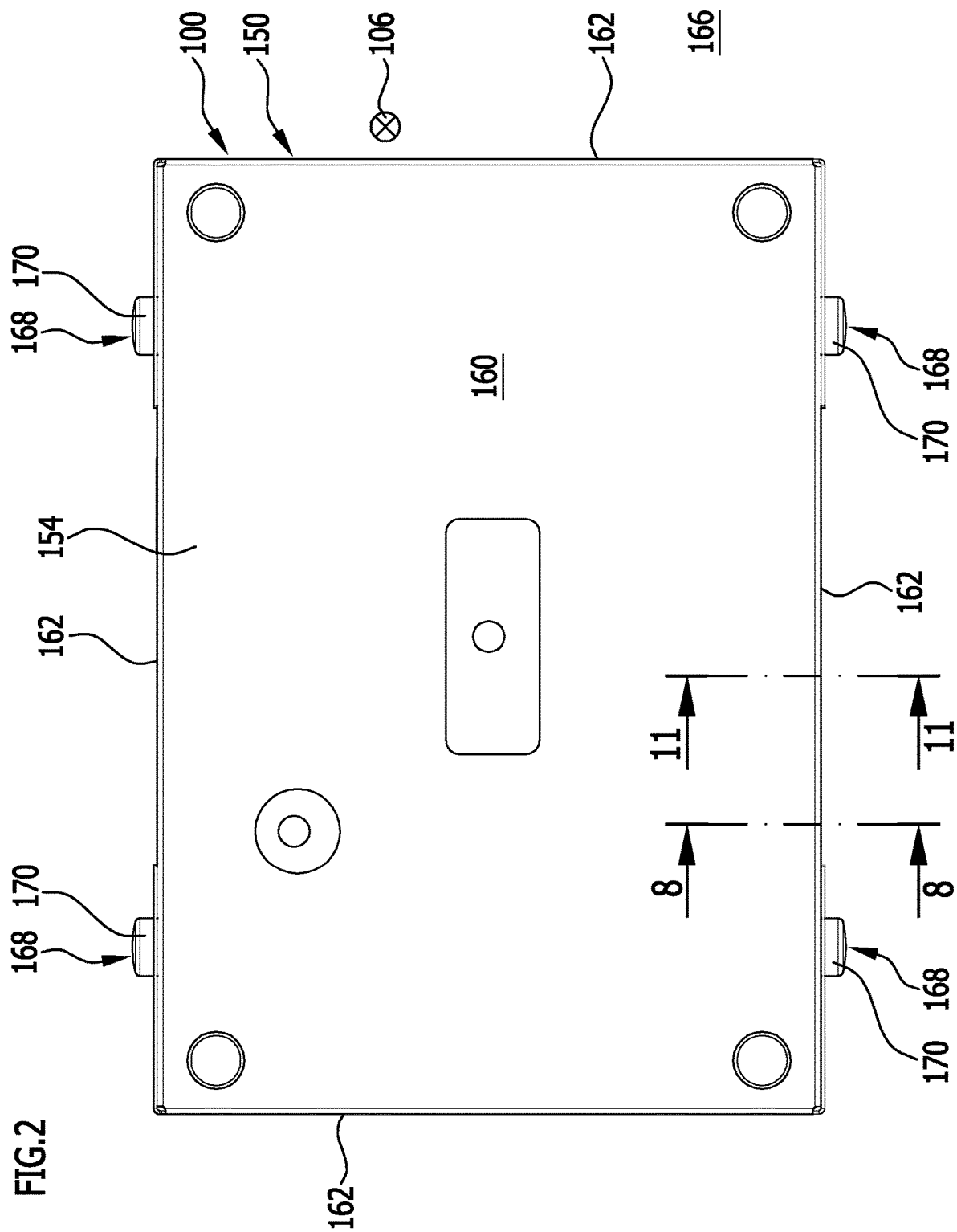
FIG. 2 shows a plan view from above of the fuel cell device from FIG. 1.
Figure 3:
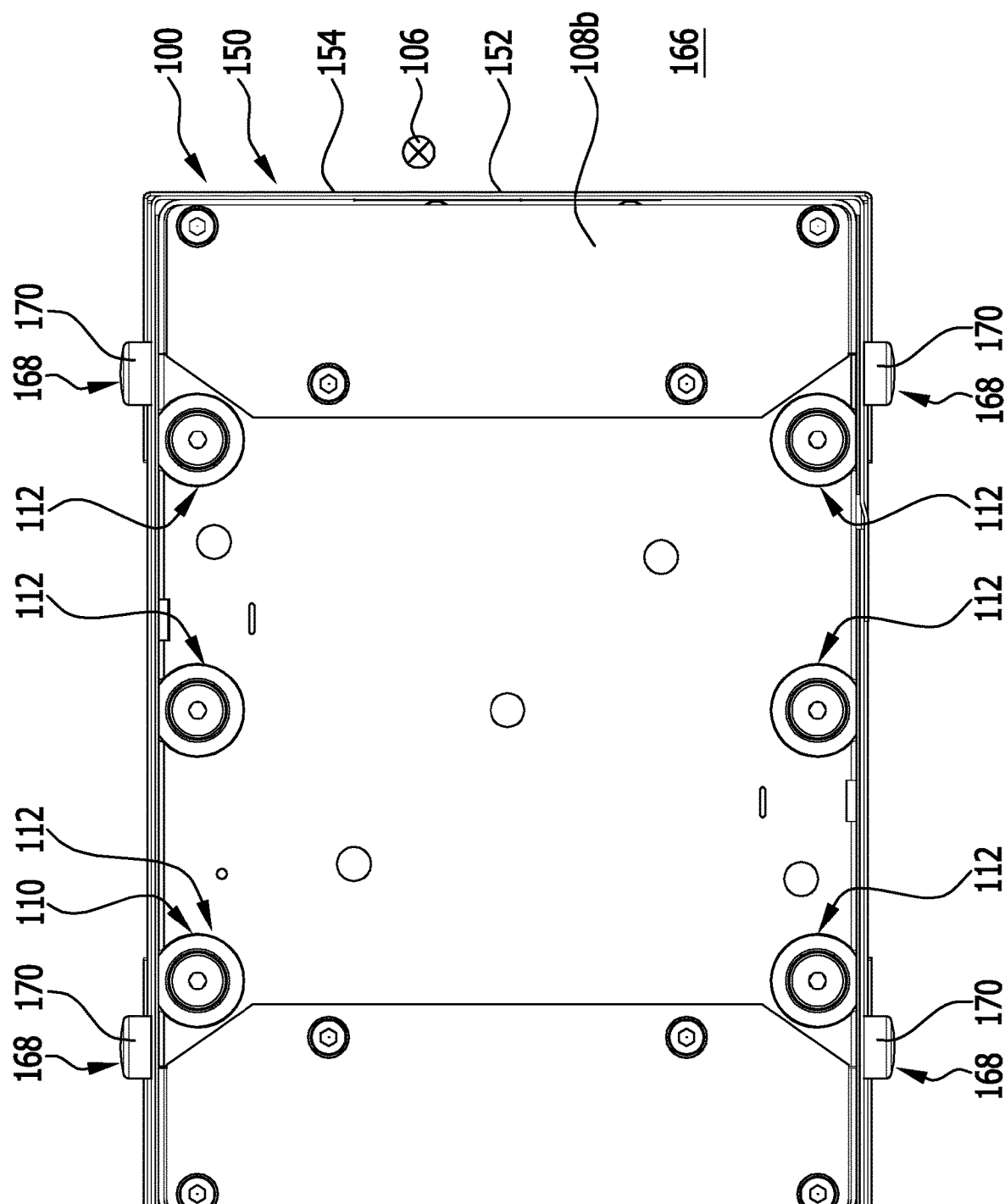
FIG. 3 shows a plan view from below of the fuel cell device from FIGS. 1 and 2.
Figure 4:
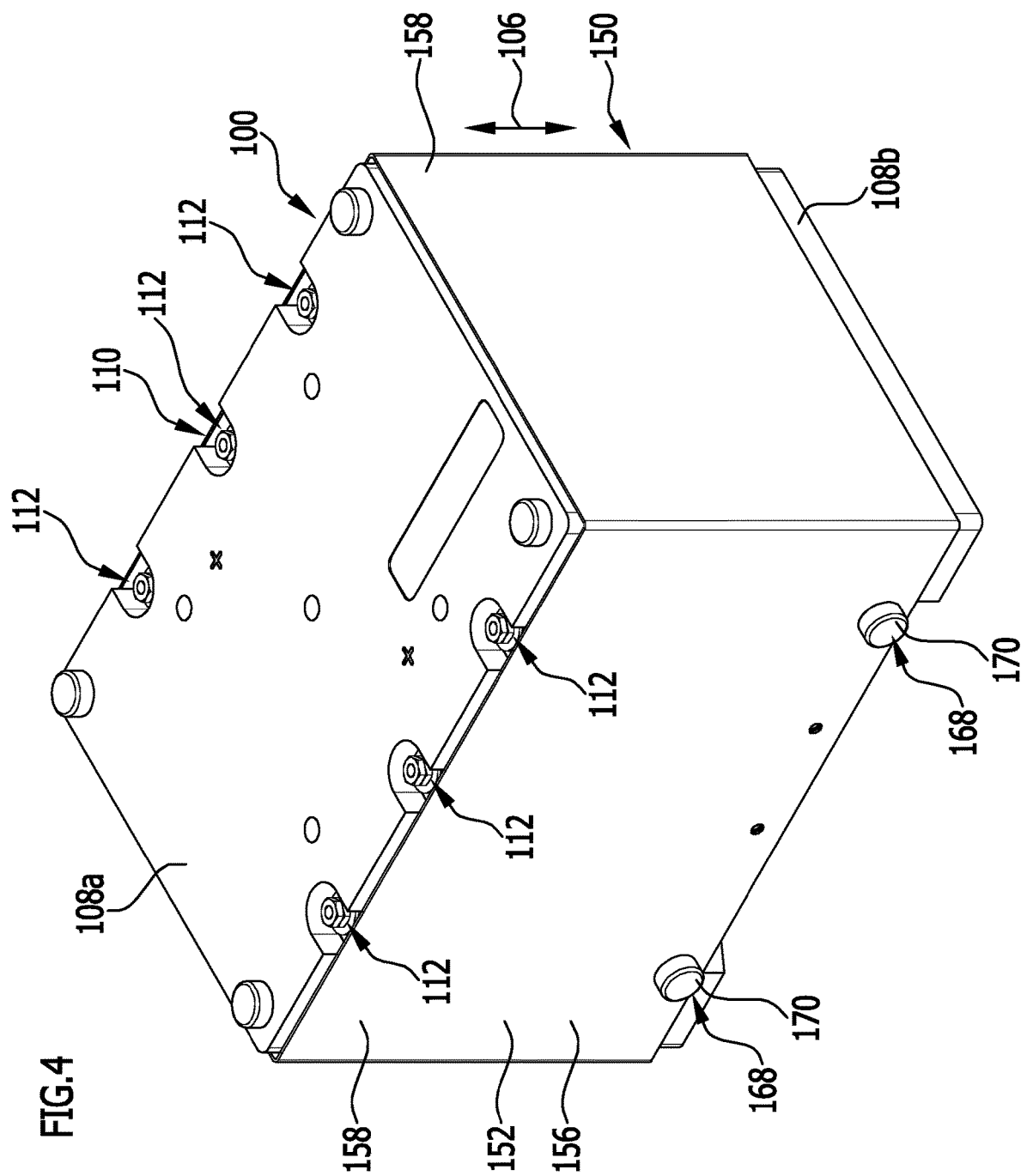
FIG. 4 shows a perspective depiction of the fuel cell device from FIG. 1 after a lid of the enclosure has been removed.
Figure 5:
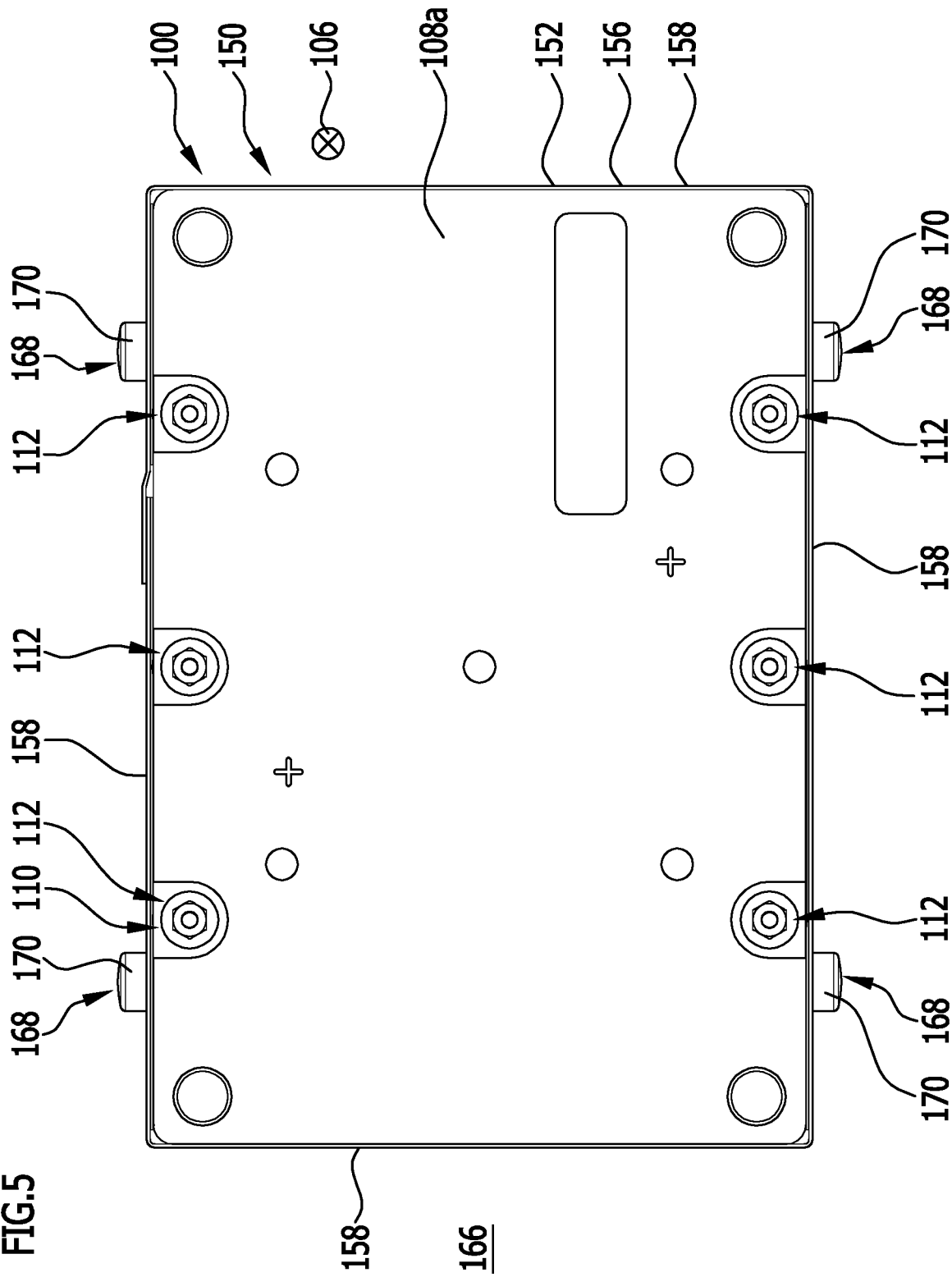
FIG. 5 shows a plan view from above of the fuel cell device from FIG. 4 with the lid removed.

As can be seen in FIG. 1, the enclosure 150 comprises a base body 152 and a lid 154.

The base body 152 may comprise, in particular, an outer shell element 156 which is of annularly closed configuration, for example, and preferably comprises a plurality of, for example four, side walls 158.

The outer shell element 156 may be formed, for example, of a thermoplastic material, in particular of a PVDF (polyvinylidene fluoride) material, or of a, preferably glass fiber-reinforced, PA (polyamide) material, or of an organic sheet material.

The base body 152 may be composed of a plurality of, for example two, outer shell elements 156 in order to facilitate the mounting of the base body 152 on the end plates 108a, 108b and on the fuel cell stack 102.

The lid 154 of the enclosure 150 may have a, for example substantially cuboidal, cover plate 160 and one or more, for example four, side walls 162 extending, preferably substantially at a right angle, away from the cover plate 160.

The clear width of the lid 154 between the side walls 162 of the lid 154 is preferably minimally greater than the outer contour of the base body 152 on the upper rim thereof, such that the lid 154 is able to be slipped over the upper rim region of the base body 152.

The lid 154 may be formed of a thermoplastic material, in particular of a PVDF (polyvinylidene fluoride) material, or of a, preferably glass fiber-reinforced, PA (polyamide) material, or of an organic sheet material.

The material of the lid 154 may be different from the material of the base body 152 or be identical to the material of the base body 152.

Figure 11:
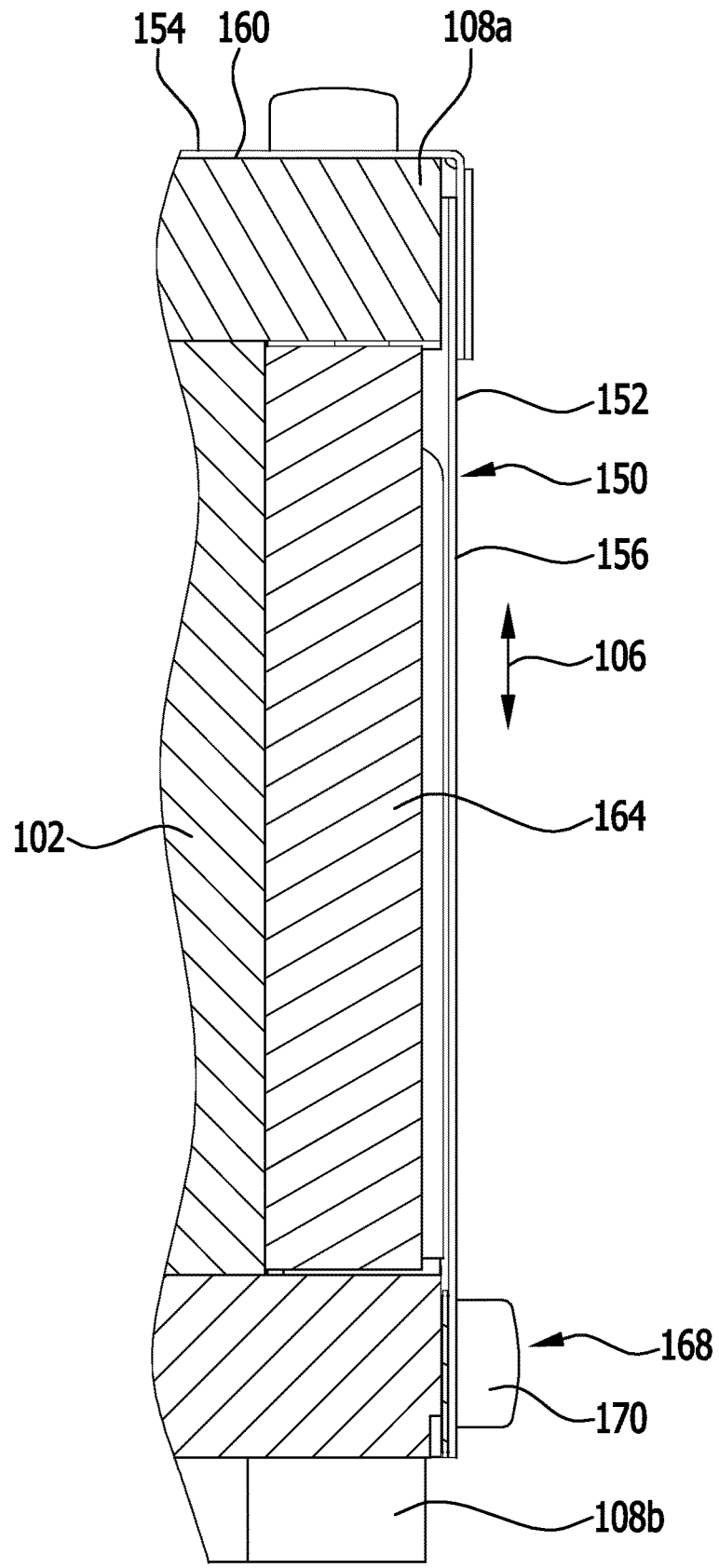
FIG. 11 shows a section through the fuel cell device from FIGS. 1 to 3 in the region of a foam material element of the enclosure, along the stacking direction of the fuel cell stack and along the line 11-11 in FIG. 2.

As can be seen in FIGS. 6 and 11, the enclosure 150 preferably comprises one or more foam material elements 164 which serve to reduce the free remaining volume within the base body 152 of the enclosure 150 and are arranged between the fuel cell stack 102 on the one hand and the base body 152 of the enclosure 150 on the other hand.

The foam material elements 164 preferably comprise a closed-porous foam material.

The foam material elements 164 may comprise a silicone foam material, for example.

The foam material elements 164 are preferably produced separately from the base body 152 of the enclosure 150 and, in the state detached from the base body 152, are arrangeable on the fuel cell stack 102, as is depicted in FIG. 6.

Provision may hereby be made, in particular, for in each case one foam material element 164 to be arranged between in each case two clamping elements 112 of the clamping device 110 of the fuel cell device 100.

The foam material elements 164 are preferably configured plate-shaped, in particular in the form of substantially planar plates.

The foam material elements 164 are preferably separated, in particular cut or punched, out of a foam material in such a way that the shape thereof is adapted as well as possible to the shape of in each case one interspace between the fuel cell stack 102, two clamping elements 112 of the clamping device 110, and the base body 152.

The free remaining volume that remains within the enclosure 150 between the enclosure 150, the fuel cell stack 102, the end plates 108*a*, 108*b*, and the clamping device 110 is preferably less than 20%, in particular less than 10%, particularly preferably less than 5%, of the entire internal volume of the enclosure 150, i.e. of the volume that is delimited outwardly by the foam material elements 164, the base body 152, and the lid 154 of the enclosure 150.

The free remaining volume remaining within the enclosure 150 is preferably so small that a tertiary explosion protection is ensured for the fuel cell device 100.

This means that even when an explosive mixture, in particular a hydrogen-containing mixture, is present in the free remaining volume within the enclosure 150 and this mixture is indeed ignited, the free remaining volume in which the explosion takes place is so small and/or is subdivided into small individual volumes such that the fuel cell stack 102 and the enclosure 150 are not damaged by the explosion, and thus retain their full functionality even after an explosion.

In particular, provision may be made for the distance between the outside of the fuel cell stack 102 and the inside of the enclosure 150, taken perpendicularly to the stacking direction 106, to be less than 5 mm, preferably less than 2 mm, particularly preferably less than 1 mm, substantially everywhere.

The enclosure 150 is preferably configured such that it is sealed against the penetration of dirt and/or moisture into the interior of the enclosure 150.

In particular, the enclosure may be configured such that it corresponds at least to the protection rating IP6X in accordance with DIN EN 60529.

Provision is preferably further made for the enclosure 150 to be configured such that it corresponds at least to the water protection rating 4, in particular at least to the water protection rating 5, particularly preferably at least to the water protection rating 6, most preferably at least to the water protection rating 7, in accordance with DIN EN 60529.

The enclosure 150 preferably comprises a material which corresponds at least to the fire protection class V0.

Provision is particularly preferably made for the enclosure 150 to consist of a material or of a plurality of materials which correspond at least to the fire protection class V0.

In order to prevent an overpressure from building up within the enclosure 150 and leading to a hazard in case of failure in the event of a leakage of the fuel cell stack 102, the enclosure 150 preferably has a gas exchange opening and/or a gas exchange valve, by means of which gas is able to escape the interior of the enclosure 150 into the surroundings 166 of the enclosure 150 and the fuel cell device 100.

In order to enable a flow out of the enclosure 150 of liquid exiting the fuel cell stack 102, collecting between the enclosure 150 and the fuel cell stack 102, or condensing in the interspace between the enclosure 150 and the fuel cell stack 102, provision is preferably made for the enclosure 150 to have a liquid outlet opening and/or a liquid outlet valve.

Such a liquid outlet opening and/or such a liquid outlet valve may be connected to a liquid discharge conduit.

The liquid discharge conduit may be configured in particular as a pipeline or as a hose line.

The liquid discharge conduit may connect the liquid outlet opening and/or the liquid outlet valve to a liquid collecting means arranged outside of the enclosure 150.

The enclosure 150 is fixed on at least one of the end plates 108*a*, 108*b*, preferably on both end plates 108*a*, 108*b*, by means of in each case at least one fastening arrangement 168.

The enclosure 150 is preferably respectively releasably fixed on the end plate 108*a* and/or on the end plate 108*b*.

A fastening arrangement 168 may comprise in particular a screw, a spring disc, a washer, and/or a cap ring.

Furthermore, the fuel cell device 100 may comprise at least one cover cap 170 for covering in each case one fastening arrangement 168, in particular from the outside of the enclosure 150.

The enclosure 150 is preferably releasable from the fuel cell stack 102.

For mounting the enclosure 150 described above on the fuel cell stack 102 and the end plates 108*a*, 108*b* braced against each other by means of the clamping device 110, the following steps are completed:

The foam material elements 164 of the enclosure 150 are placed on the outside of the fuel cell stack 102 onto the stack and in between the clamping elements 112 following each other in the circumferential direction of the fuel cell stack 102.

In the assembled state of the fuel cell device 100, electrical lines to be fed out of the enclosure 150 are placed into respective grooves provided therefor in one of the end plates 108*a* or 108*b*.

Then, the base body 152 of the enclosure 150 is pushed over the end plate 108*a* and is pushed further in the stacking direction 106 to the further end plate 108*b*.

The lid 154 of the enclosure 150 is placed on the base body 152.

The base body 152 is, preferably releasably, fixed, in particular by screwing, on the end plate 108*b* by means of the fastening arrangement 168.

A cover cap 170 is placed on each fastening arrangement 168 in order to cover the respective fastening arrangement 168 from the outside of the enclosure 150.

The cover cap 170 is hereby preferably latchable to a constituent part of the fastening arrangement 168, for example to a screw of the fastening arrangement 168.

The mounting of the enclosure 150 on the end plates 108*a*, 108*b* and on the fuel cell stack 102 is thus complete.

The invention claimed is:

1. A fuel cell device, comprising
a fuel cell stack, which comprises a plurality of fuel cell units following each other in a stacking direction, and two end plates, between which the fuel cell stack is arranged,
wherein the fuel cell device comprises an enclosure which surrounds the fuel cell stack and the end plates, wherein the free remaining volume that remains within the enclosure between the enclosure, the fuel cell stack, and the end plates is less than 20% of the internal volume of the enclosure, wherein the enclosure is fixed on at least one end plate by means of at least one fastening arrangement and wherein the fuel cell device comprises at least one cover cap for covering at least one of the at least one fastening arrangement.

2. The fuel cell device in accordance with claim 1, wherein the free remaining volume remaining within the enclosure is so small that a tertiary explosion protection is ensured for the fuel cell device.

3. The fuel cell device in accordance with claim 1, wherein the enclosure is sealed against the penetration of dirt and/or moisture into the interior of the enclosure.

4. The fuel cell device in accordance with claim 1, wherein the enclosure is configured such that is corresponds at least to the protection rating IP6X.

5. The fuel cell device in accordance with claim 1, wherein the enclosure is configured such that it corresponds at least to the water protection rating 4.

6. The fuel cell device in accordance with claim 1, wherein the distance between the outside of the fuel cell stack and the inside of the enclosure perpendicular to the stacking direction is less than 5 mm substantially everywhere.

7. The fuel cell device in accordance with claim 1, wherein the enclosure comprises a foam material.

8. The fuel cell device in accordance with claim 1, wherein the enclosure comprises an outer shell element made of a thermoplastic material or of an organic sheet material.

9. The fuel cell device in accordance with claim 1, wherein the enclosure comprises a material which corresponds at least to the fire protection class V0.

10. The fuel cell device in accordance with claim 1, wherein the enclosure comprises a base body and a lid.

11. The fuel cell device in accordance with claim 10, wherein the base body is composed of a plurality of shell elements.

12. The fuel cell device in accordance with claim 1, wherein the enclosure has a gas exchange opening and/or a gas exchange valve.

13. The fuel cell device in accordance with claim 1, wherein the enclosure has a liquid outlet opening and/or a liquid outlet valve.

* * * * *